(12) United States Patent
Markkanen et al.

(10) Patent No.: US 7,344,074 B2
(45) Date of Patent: Mar. 18, 2008

(54) MOBILE TERMINAL FEATURING SMART CARD INTERRUPT

(75) Inventors: Panu S. Markkanen, Oulu (FI); Petri P. Lämsä, Oulu (FI)

(73) Assignee: Nokia Corporation, Espoo (FI)

( * ) Notice: Subject to any disclaimer, the term of this patent is extended or adjusted under 35 U.S.C. 154(b) by 720 days.

(21) Appl. No.: 10/118,658

(22) Filed: Apr. 8, 2002

(65) Prior Publication Data

US 2003/0189096 A1 Oct. 9, 2003

(51) Int. Cl.
*G06K 7/08* (2006.01)

(52) U.S. Cl. ............... 235/451; 235/492; 235/435

(58) Field of Classification Search ............ 235/451, 235/382, 384, 449, 441, 492, 486–487, 380; 455/458, 459, 41.2, 41.3
See application file for complete search history.

(56) References Cited

U.S. PATENT DOCUMENTS

| | | | |
|---|---|---|---|
| 4,835,373 A | | 5/1989 | Adams et al. |
| 5,412,318 A | * | 5/1995 | Vauclin ............ 324/708 |
| 5,434,919 A | * | 7/1995 | Chaum ............ 380/30 |
| 5,510,720 A | * | 4/1996 | Vauclin ............ 324/652 |
| 5,594,233 A | * | 1/1997 | Kenneth et al. ............ 235/492 |
| 5,635,701 A | * | 6/1997 | Gloton ............ 235/486 |
| 5,773,812 A | * | 6/1998 | Kreft ............ 235/492 |
| 5,942,738 A | * | 8/1999 | Cesaire et al. ............ 235/380 |
| 6,092,133 A | * | 7/2000 | Erola et al. ............ 710/301 |
| 6,095,423 A | * | 8/2000 | Houdeau et al. ............ 235/487 |
| 6,097,967 A | * | 8/2000 | Hubbe et al. ............ 455/558 |
| 6,128,511 A | * | 10/2000 | Irie ............ 455/558 |
| 6,157,966 A | * | 12/2000 | Montgomery et al. ............ 710/8 |
| 6,165,021 A | * | 12/2000 | Bourne ............ 439/630 |
| 6,202,927 B1 | * | 3/2001 | Bashan et al. ............ 235/451 |
| 6,202,932 B1 | * | 3/2001 | Rapeli ............ 235/491 |
| 6,234,391 B1 | * | 5/2001 | Reichardt et al. ............ 235/441 |
| 6,240,301 B1 | * | 5/2001 | Phillips ............ 455/558 |
| 6,247,644 B1 | * | 6/2001 | Horne et al. ............ 235/380 |
| 6,325,293 B1 | * | 12/2001 | Moreno ............ 235/492 |
| 6,339,384 B1 | * | 1/2002 | Valdes-Rodriguez ............ 340/928 |
| 6,378,774 B1 | * | 4/2002 | Emori et al. ............ 235/492 |

(Continued)

FOREIGN PATENT DOCUMENTS

CN 1245620 2/2000

(Continued)

OTHER PUBLICATIONS

3rd Generation Partnership Project (3GPP TS 42.017) V4.0.0 (2001-03) ; Technical Specification Group Terminals; Subscriber Identity Modules (SIM) ; Functional characteristics (Release 4) , pp. 1-12.

(Continued)

*Primary Examiner*—Thien M. Le
*Assistant Examiner*—Edwyn Labaze

(57) ABSTRACT

A method for activating a user interface of a mobile terminal or device having an ISO14443 smart card attached in a ISO7816 reader, where the mobile device monitors the state of the inactive ISO7816 interface, the ISO14443 smart card changes the state of one or more of the ISO7816 contacts when it needs user interaction during contactless communication, and when a state change occurs that did not originate in the mobile device, an interrupt is generated that communicates to the mobile device that smart card requires its services.

23 Claims, 4 Drawing Sheets

U.S. PATENT DOCUMENTS

| | | |
|---|---|---|
| 6,398,111 B2 * | 6/2002 | Reichardt et al. ............ 235/441 |
| 6,434,238 B1 * | 8/2002 | Chaum et al. ................. 380/45 |
| 6,447,140 B1 * | 9/2002 | Lu ............................... 362/109 |
| 6,484,024 B1 * | 11/2002 | Darnault et al. ............. 455/418 |
| 6,572,015 B1 * | 6/2003 | Norton ......................... 235/382 |
| 6,577,229 B1 * | 6/2003 | Bonneau et al. .......... 340/10.41 |
| 6,581,122 B1 * | 6/2003 | Sarat ........................... 710/301 |
| 6,591,229 B1 * | 7/2003 | Pattinson et al. ............ 702/189 |
| 6,655,599 B2 * | 12/2003 | Thueringer et al. .......... 235/492 |
| 6,671,522 B1 * | 12/2003 | Beaudou ...................... 455/558 |
| 6,776,339 B2 * | 8/2004 | Piikivi ......................... 235/451 |
| 6,942,147 B2 * | 9/2005 | Lahteenmaki et al. ....... 235/441 |
| 6,978,157 B1 * | 12/2005 | Amiens ........................ 455/558 |
| 7,011,247 B2 * | 3/2006 | Drabczuk et al. ............ 235/451 |
| 2003/0183691 A1 * | 10/2003 | Lahteenmaki et al. ....... 235/441 |
| 2004/0127256 A1 * | 7/2004 | Goldthwaite et al. ........ 455/558 |
| 2004/0176071 A1 * | 9/2004 | Gehrmann et al. ........... 455/411 |
| 2004/0259449 A1 * | 12/2004 | Oba et al. .................... 455/41.2 |
| 2005/0274803 A1 * | 12/2005 | Lee .............................. 235/439 |
| 2007/0012763 A1 * | 1/2007 | Van de Velde et al. ...... 235/380 |
| 2007/0213096 A1 * | 9/2007 | Bella et al. .................. 455/558 |

FOREIGN PATENT DOCUMENTS

| | | |
|---|---|---|
| EP | 0820178 A2 | 1/1998 |
| EP | 0945828 A2 | 9/1999 |
| FR | 2797070 A | 2/2001 |
| GB | 2358991 A | 8/2001 |
| WO | 98/33343 A | 7/1998 |
| WO | 98/58509 A | 12/1998 |
| WO | 99/01960 A | 1/1999 |

OTHER PUBLICATIONS

Digital Cellular Telecommunications System (phase 2+) (GSM); specification of the SIM Application Toolkit for the Subscriber Identity Module-Mobile Equipment (SIM-ME) interface (GSM 11.14 version 8.3.0 Release 1999) ETSI TS 101 267 V8.3.0, Aug. 2000 (Aug. 2000), pp. 1-69, 114, 115, XP002222021.

* cited by examiner

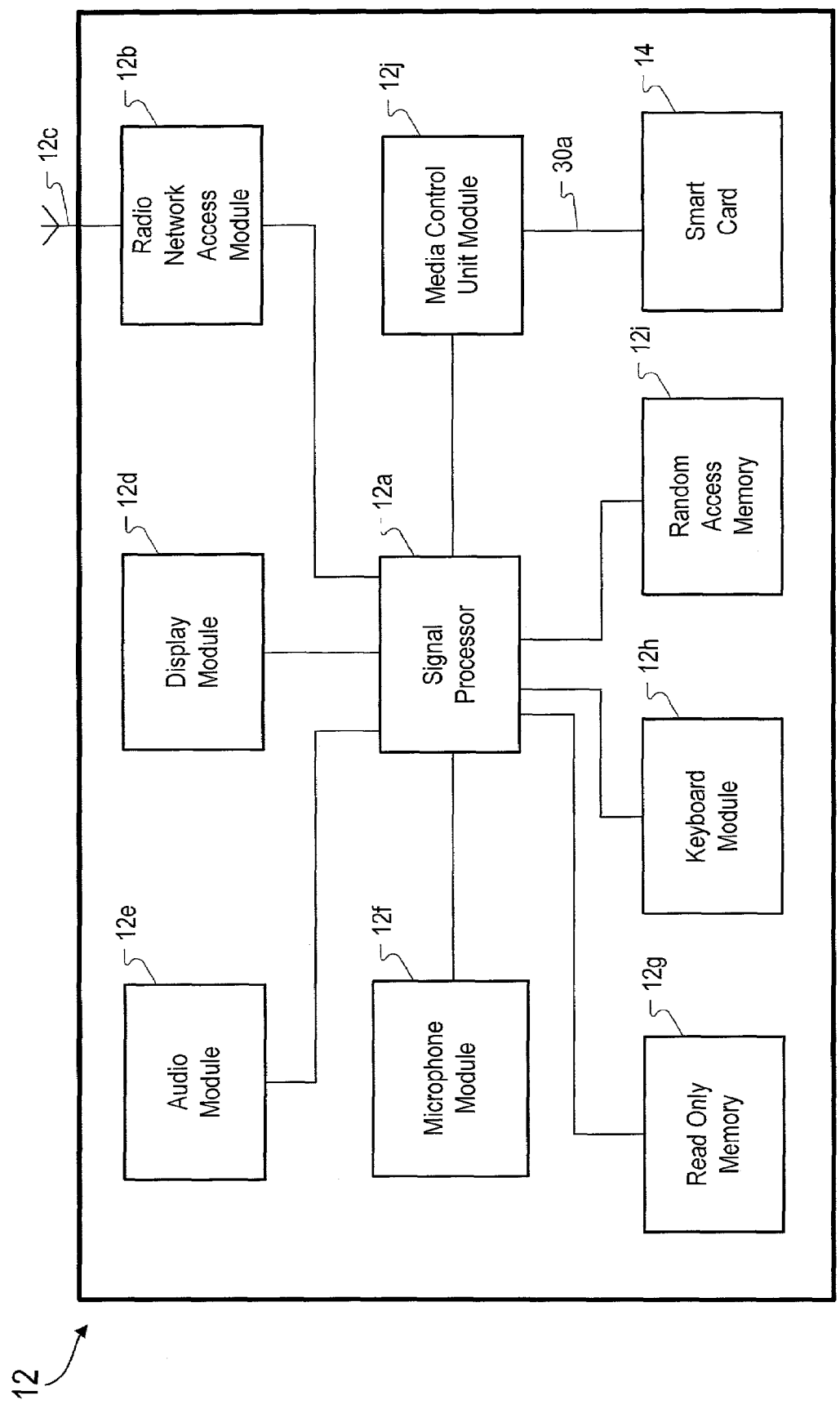
Figure 3: Mobile Terminal

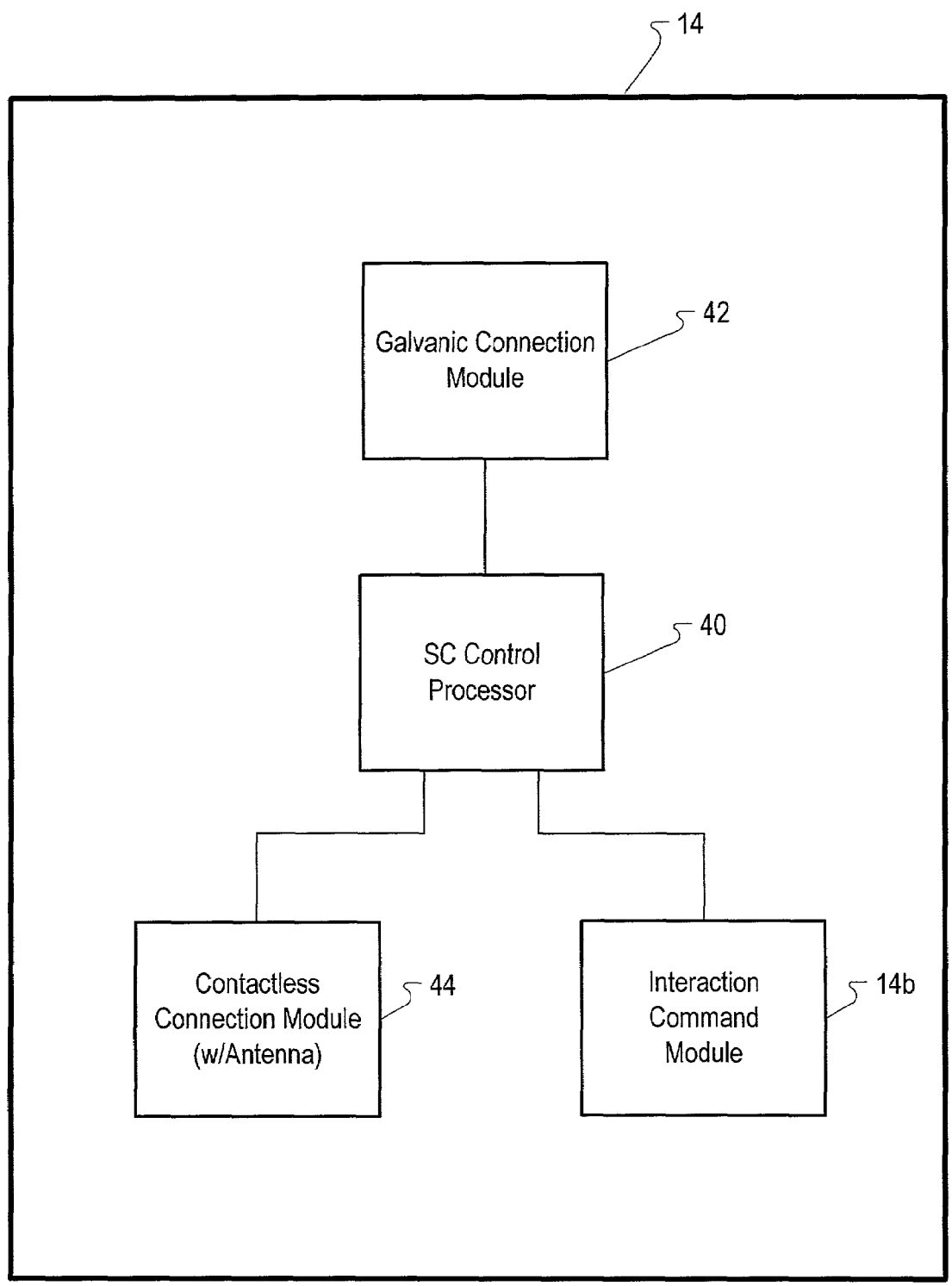
Figure 4: Smart Card

MOBILE TERMINAL FEATURING SMART CARD INTERRUPT

BACKGROUND OF THE INVENTION

1. Field of Invention

The present invention relates to a wireless terminal or phone; and more particularly relates to a wireless terminal having a smart card.

2. Description of Related Art

Smart cards (SC) with an International Standardization Organization (ISO) 14443 contactless interface are deployed in the field and are being used in numerous applications ranging from public transport ticketing to access control and further to payment schemes.

Many applications require the loading of a value or other similar information on the smart card. This is normally done with SC readers installed on public locations like, in the case of a public transport smart card, subway stations. In those cases the smart card typically incorporates a galvanic ISO7816 interface in addition to a contactless one. This galvanic ISO7816 interface is used when the smart card is inserted into the reader/loader device.

Mobile phones utilize many kinds of smart cards, the most well-known being the subscriber identity module (SIM) card used in the GSM system (i.e. global system for mobile communications). The GSM SIM card has an ISO7816 interface that allows the SIM card to communicate with the mobile phone. The addition of an antenna and support of the ISO14443 interface make it possible to use the SIM card resident in the phone in the same applications where contactless smart cards are used. Furthermore, when the SIM card is in the ISO7816 reader in the phone, the phone can have additional functionality that adds value for the card user, like user interface to applications (ticketing, access control etc) on the SIM card.

When the SIM card is not being actively used in the phone, it is typically powered off. Also, when it is being used, the communication in the ISO7816 interface is always initiated by the ISO14443 reader. However, it may be necessary in many applications to activate the phone user interface when the card comes into the proximity of a ISO14443 reader. Such cases might be for instance the use of a high-value ticket, or executing a payment transaction that goes over a certain value.

In these cases the card might require, for instance, the user to enter a PIN code to authorize the transaction. But if the phone is idle, the smart card has no means to communicate its needs to the user since it is communicating through the ISO14443 interface and it cannot initiate communication over the ISO7816 interface.

One known approach to this problem respects the master/slave relation between the card reader, the mobile terminal, and the smart card, as the slave. In this approach, the smart card indicates in status bytes sent in a response to a command that it has additional information, not related to the executed command, for the mobile terminal to retrieve.

SUMMARY OF INVENTION

In its broadest sense, the present invention provides a new and unique method and apparatus for establishing an interaction between a mobile terminal and a smart card arranged therein. The invention features the smart card providing an interaction command signal to the mobile terminal to initiate the interaction. The interaction command signal may include a change in the state of one or more contacts between the mobile terminal and the smart card. The smart card provides the interaction command signal during a contactless connection with another device. The one or more contacts are a part of a galvanic connection. The mobile terminal has a media control unit module that responds to the interaction command signal, generates an interrupt signal to establish the interaction, activates an interface with the smart card and runs a query to find out what services the smart card requires. The smart card has an interaction command module for changing the state of the one or more contacts to initiate the interaction between the mobile terminal and the smart card.

In one particular embodiment, when an ISO14443 smart card needs user interaction during contactless communication, it indicates this by changing the state of one or more of its ISO7816 contacts. The mobile terminal monitors the state of the contact, filtering out the state changes that happen when an ISO7816 interface is active. When a state change occurs that did not originate in the mobile terminal, the interrupt is generated to communicate to the mobile terminal that SC requires its services. The mobile terminal then activates the ISO7816 interface and runs the query to find out what services the smart card needs.

One advantage of the present invention is that the smart card can initiate communications whenever needed compared to the known smart card which only could give an indication in conjunction with execution of a command from the smart card reader. The interaction is established between the mobile terminal and the smart card without having to respect the normal master slave relationship between the mobile terminal and the smart card.

The invention may be used in GSM or 3G Mes mobile telecommunication systems.

BRIEF DESCRIPTION OF THE DRAWING

The drawing, not drawn to scale, includes the following Figures:

FIG. 3 is a diagram of the mobile terminal shown in FIG. 1 according to the present invention.

FIG. 4 is a diagram of the smart card shown in FIG. 1 according to the present invention.

DETAILED DESCRIPTION OF INVENTION

Figure 1:
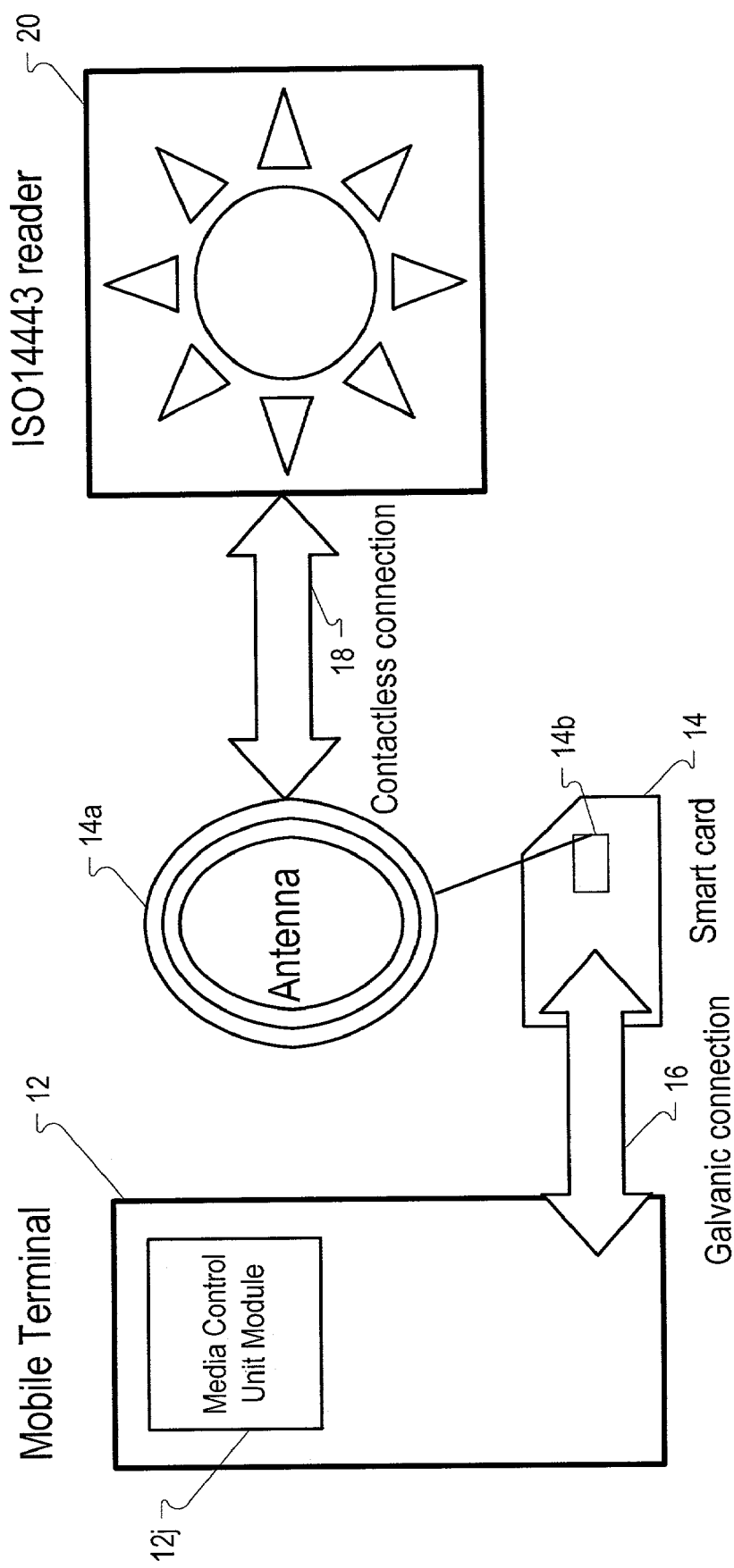
FIG. 1 is a diagram of a system having a mobile terminal and a smart card according to the present invention.

FIG. 1: The Basic Invention

FIG. 1 shows a system generally indicated as 10 having a mobile terminal 12 with a smart card 14 arranged therein. According to the present invention, the smart card 14 provides an interaction command signal to the mobile terminal 12 to initiate an interaction between the mobile terminal 12 and the smart card 14. The mobile terminal 12 and the smart card 14 are coupled together by a galvanic connection 16 having one or more contacts. The interaction command signal contains information about a change in the state of one or more contacts of the galvanic connection 16. The smart card 14 has an antenna 14a and an interaction command module 14b, which changes the state of the one or more contacts to initiate the interaction between the mobile terminal 12 and the smart card 14, and provides the interaction command signal during a contactless connection generally indicated as 18 with another device, such as a contactless reader 20. The antenna 14a may be either built-in or connected to it through some contacts, possibly using the contacts in a ISO7816 interface. In operation, the mobile terminal 12 responds to the interaction command signal, generates an interrupt signal to establish the interaction, activates an interface with the smart card 14 and runs a query to find out what services the smart card 14 requires. In one typical embodiment, the smart card 14 would communicate with the mobile terminal 12 through a galvanic ISO7816 interface and with a ISO14443 contactless reader through an ISO14443 antenna.

Figure 2:
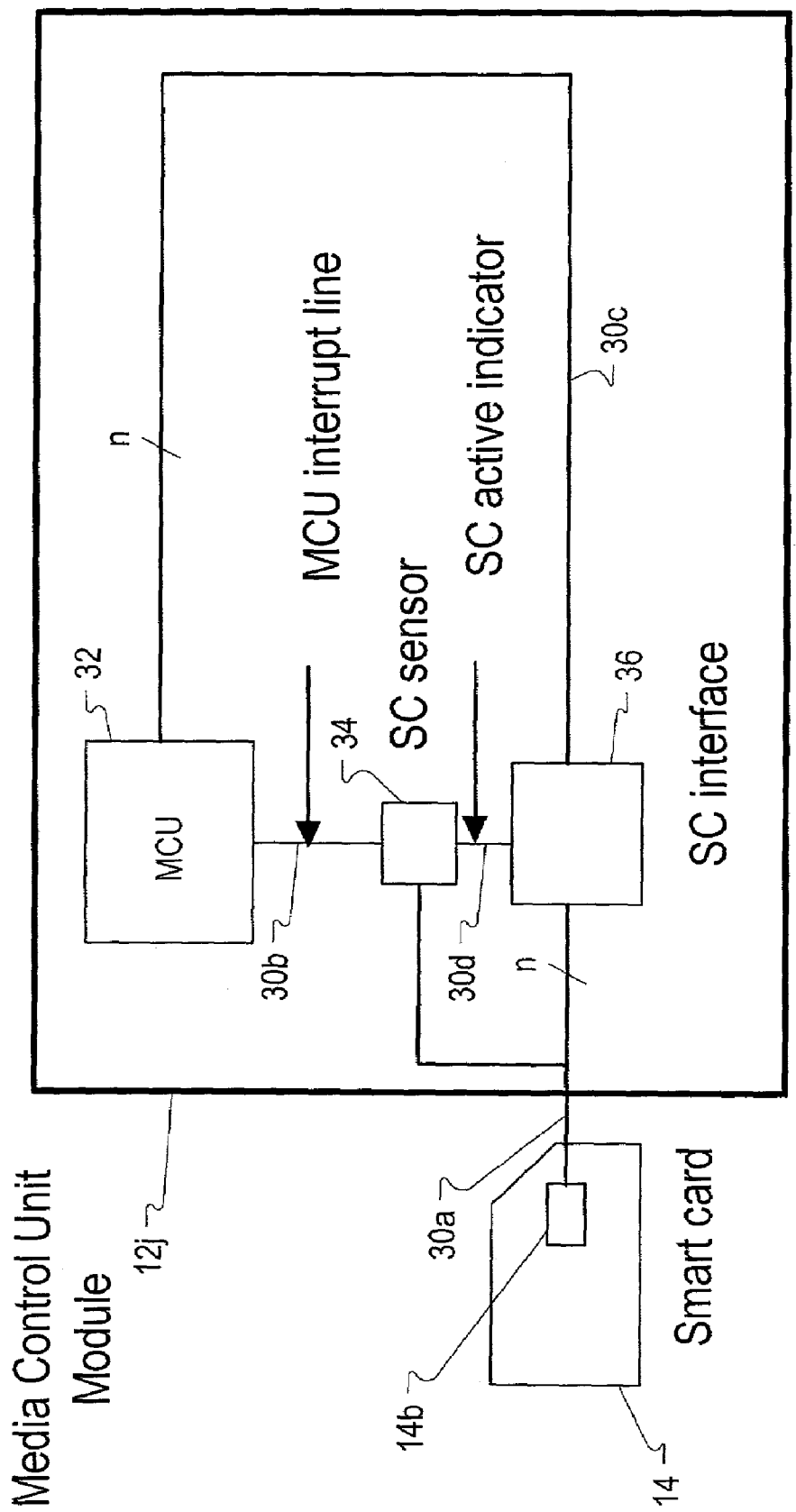
FIG. 2 is a diagram of a media control unit module and the smart card shown in FIG. 1 according to the present invention.

FIG. 2: The Media Control Unit Module 12j

FIG. 2 shows a media control unit module generally indicated as 12j having a media control unit (MCU) 32, a smart card sensor 34 and a smart card interface 36. The smart card sensor 34 responds to the interaction command signal along line 30a from the smart card 14, and provides a media control unit interrupt signal along a media control unit interrupt line to the media control unit 32. The media control unit 32 provides a media control unit query signal along line 30c through the smart card interface 36 to find out what services the smart card 14 requires. The smart card interface 36 is an SC interface chip that is used to communicate with the smart card 14 through the ISO7816 galvanic interface. The smart card interface 36 consists of a number of contacts, one or more of which is monitored by the smart card sensor 34. This monitoring is active when the smart card interface 36 indicates through the SC active indicator signal along line 30d that the smart card 14 is not active. If activity is detected in one of the monitored contacts, the smart card sensor 34 will generate the interrupt to the media control unit 32 or to a media control unit controller (not shown). In effect, the media control unit module 12j monitors the state of the one or more contacts and filters out state changes that happen when the interface between the mobile terminal 12 and the smart card 14 is active.

FIG. 3: The Mobile Terminal 12

FIG. 3 shows a block diagram of the mobile terminal 12 shown in FIG. 1, and includes a signal processor 12a connected to a radio access network module 12b (connected to an antenna 12c), a display module 12d, an audio module 12e, a microphone 12f, a read only memory 12g (ROM or EPROM), a keyboard module 12h and a random access memory 12i (RAM). The signal processor 12a controls the basic operation of wireless terminal 12, the operation of which is known in the art. Moreover, the scope of the invention is not intended to be limited to any particular kind or type of the aforementioned elements 12a, 12b, . . . , 12i. For example, the scope of the invention is intended to include the radio access network module 12b being either an antenna module, a radio frequency (RF) module, a radio modem or the like. The wireless terminal 12 may also include many other circuit elements known in the art which are not shown or described herein.

In the media control unit module 12j, the media control unit 32 controls interface functions between the mobile terminal 12 and the smart card 14. The media control unit 32 may be implemented using hardware, software, or a combination thereof. In a typical software implementation, the media control unit 32 would be a microprocessor-based architecture having a microprocessor, a random access memory (RAM), a read only memory (ROM), input/output devices and control, data and address buses connecting the same. A person skilled in the art of programming, especially programming of wireless terminals, would be able to program such a microprocessor-based implementation to perform the functionality described herein without undue experimentation.

The scope of the invention is not intended to be limited to any specific kind of mobile terminal or device, and many different mobile terminals or device, including laptop or notebook computers, are envisioned that may contain the fundamental features of the present invention described herein.

FIG. 4: Smart Card Interaction Command Module 14b

FIG. 4 shows the smart card 14 having a smart card control processor 40, a galvanic connection module 42, a contactless connection module 44 and the interaction command module 14b. The smart card control processor 40 controls the basic operation of smart card 14, the operation of which is known in the art. Moreover, the scope of the invention is not intended to be limited to any particular kind or type of the aforementioned elements 40, 42, 44. The smart card 14 may also include many other circuit elements or modules known in the art which are not shown or described herein. In the smart card 14, the interaction command module 14b controls interface functions between the mobile terminal 12 and the smart card 14. The interaction command module 14b may be implemented using hardware, software, or a combination thereof. In a typical software implementation, the interaction command module 14b may be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation. The scope of the invention is not intended to be limited to any specific kind of smart card, and many different smart cards or SIM cards are envisioned that may contain the fundamental features of the present invention described herein.

Implementation Considerations

The implementation of the invention would require certain criterion to be considered which may not be used in a typical mobile terminal. For example, embodiments are envisioned in which an interface clock in the smart card would be running in order to operate any signals on the interface. During normal operation, the smart card clock is typically turned off in the terminal in order to save power. Due to architectural issues inside the mobile terminal, the power consumption will increase significantly if the smart card clock is kept on all the time. Alternatively, embodiments are also envisioned in which the feature of the present invention is expected to work without the interface clock, in this case an internal oscillator on the smart card could be used, which may cause interference problems.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A method comprising:
   coupling a mobile terminal having a smart card to another device via a contactless connection using the smart card; and
   providing an interaction command signal from the smart card to the mobile terminal to initiate interaction and require a service from the mobile terminal related to the contactless connection with the other device, the interaction command signal including a change in the state of one or more contacts between the mobile terminal and the smart card.

2. A method according to claim 1, wherein the smart card provides the interaction command signal during the contactless connection with the other device.

3. A method according to claim 1, wherein the mobile terminal responds to the interaction command signal and generates an interrupt signal to establish the interaction.

4. A method according to claim 1, wherein the mobile terminal activates an interface with the smart card and runs a query to find out what services or information the smart card requires.

5. A method according to claim 1, wherein the mobile terminal monitors the state of the one or more contacts and filters out state changes that happen when the interface between the mobile terminal and the smart card is active.

6. A method according to claim 1, wherein the one or more contacts are a part of a galvanic connection.

7. A method according to claim 1, wherein the method further comprises the step of:
   responding to the interaction command signal, for providing an interaction reply signal from the mobile terminal to the smart card with information related to the service.

8. A method according to claim 1, wherein the smart card has an antenna formed as a part thereof, or the smart card is connected to an antenna that forms part of the mobile terminal.

9. A smart card comprising:
   one or more modules configured for coupling a mobile terminal to another device via a contactless connection; and
   one or more modules configured for providing an interaction command signal to the mobile terminal to initiate interaction and require a service from the mobile terminal related to the contactless connection with the other device, the interaction command signal including a change in the state of one or more contacts between the mobile terminal and the smart card.

10. A smart card according to claim 9, wherein the one or more contacts are a part of a galvanic connection.

11. A smart card according to claim 9, wherein the smart card provides the interaction command signal during the contactless connection with the other device.

12. A smart card according to claim 9, wherein the smart card has an antenna formed as a part thereof, or the smart card is connected to an antenna that forms part of the mobile terminal.

13. A mobile terminal comprising:
   one or more modules configured for coupling to another device via a contactless connection using a smart card; and
   a media control unit module configured for responding to an interaction command signal from the smart card to initiate interaction and require a service from the mobile terminal related to the contactless connection with the other device, the interaction command signal includes a change in the state of one or more contacts between the mobile terminal and the smart card.

14. A mobile terminal according to claim 13, wherein the one or more contacts are a part of a galvanic connection.

15. A mobile terminal according to claim 13, wherein the smart card provides the interaction command signal during the contactless connection with the other device.

16. A mobile terminal according to claim 13, wherein the media control unit module is configured to respond to the interaction command signal and generates an interrupt signal to establish the interaction.

17. A mobile terminal according to claim 13, wherein the media control unit module is configured to activate an interface with the smart card and runs a query to find out what services or information the smart card requires.

18. A mobile terminal according to claim 13, wherein the media control unit module is configured to monitor the state of the one or more contacts and filters out state changes that happen when the interface between the mobile terminal and the smart card is active.

19. A mobile terminal according to claim 13, wherein either the mobile terminal, the smart card, or both is in an inactive mode.

20. A mobile terminal according to claim 13, wherein either the smart card has an antenna formed as a part thereof, or the smart card is connected to an antenna that forms part of the mobile terminal.

21. A mobile terminal according to claim 13, wherein the media control unit module responds to the interaction command signal, for providing an interaction reply signal from the mobile terminal to the smart card with information related to the service.

22. A method comprising:
   coupling a mobile terminal having a smart card to another device via a contactless connection using the smart card, the mobile terminal monitoring the state of one or more contacts and filtering out state changes that happen when an interface between the mobile terminal and the smart card is active; and
   providing an interaction command signal from the smart card to the mobile terminal to initiate interaction and require a service from the mobile terminal related to the contactless connection with the other device.

23. A mobile terminal comprising:
   one or more modules configured for coupling to another device via a contactless connection using a smart card; and
   a media control unit module configured for responding to an interaction command signal from the smart card to initiate interaction and require a service from the mobile terminal related to the contactless connection with the other device, and also configured for monitoring the state of one or more contacts and filtering out state changes that happen when the interface between the mobile terminal and the smart card is active.

* * * * *

UNITED STATES PATENT AND TRADEMARK OFFICE
CERTIFICATE OF CORRECTION

PATENT NO.       : 7,344,074 B2
APPLICATION NO.  : 10/118658
DATED            : March 18, 2008
INVENTOR(S)      : Markkanen et al.

Page 1 of 1

It is certified that error appears in the above-identified patent and that said Letters Patent is hereby corrected as shown below:

On the Title page, page 2, References Cited, US Patent Documents, reference number "2004/0259449" should be -- 0259499 --

Signed and Sealed this

Twenty-first Day of October, 2008

JON W. DUDAS
*Director of the United States Patent and Trademark Office*